(12) United States Patent
Kimura et al.

(10) Patent No.: US 7,291,421 B2
(45) Date of Patent: Nov. 6, 2007

(54) BATTERY PACK (75) Inventors: Tadao Kimura, Kobe (JP); Shinji Hamada, Toyohashi (JP); Yoshiaki Ogata, Kosai (JP); Tomokazu Yamauchi, Toyota (JP); Toshiyuki Sekimori, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 280 days.

(21) Appl. No.: 10/360,115

(22) Filed: Feb. 7, 2003

(65) Prior Publication Data

US 2003/0118898 A1    Jun. 26, 2003

Related U.S. Application Data

(62) Division of application No. 09/684,250, filed on Oct. 6, 2000, now Pat. No. 6,569,561.

(30) Foreign Application Priority Data

Oct. 8, 1999 (JP) ................... 11-28880
Apr. 28, 2000 (JP) ............... 2000-131180

(51) Int. Cl.
  *H01M 2/02*   (2006.01)
  *H01M 10/50*  (2006.01)
  *H01M 2/24*   (2006.01)
(52) U.S. Cl. .......... 429/120; 420/99; 420/100; 420/136; 420/148; 420/159
(58) Field of Classification Search ......... 429/120, 429/159, 99, 100, 136, 176, 153, 157
See application file for complete search history.

(56) References Cited

U.S. PATENT DOCUMENTS

| | | |
|---|---|---|
| 1,152,247 A | 8/1915 | Walker |
| 4,107,402 A | 8/1978 | Dougherty et al. |
| 4,468,440 A | 8/1984 | Evjen |
| 4,693,535 A | 9/1987 | Frode |
| 4,957,829 A | 9/1990 | Holl |

(Continued)

FOREIGN PATENT DOCUMENTS

EP    0644604    3/1995

(Continued)

OTHER PUBLICATIONS

U.S. Appl. No. 09/684,421, filed Oct. 6, 2000, Hamada et al.

*Primary Examiner*—John S. Maples
(74) *Attorney, Agent, or Firm*—Jordan and Hamburg LLP (57) ABSTRACT

A battery module is constructed of an integral battery case which is constituted by forming a plurality of prismatic cell cases into a unitized body, wherein positive electrode plates and negative electrode plates laminated alternately upon one another with intervening separators are respectively accommodated in each of the cell cases, thereby constituting a plurality of cells, these cells being electrically connected in series. A plurality of such battery modules are arranged in a direction in which the electrode plates within each cell are laminated in a condition with coolant passages formed between the battery modules, and bound tightly together with end plates arranged at both ends in the direction of adjacent arrangement of the battery modules.

13 Claims, 12 Drawing Sheets

U.S. PATENT DOCUMENTS

| | | |
|---|---|---|
| 5,456,994 A | 10/1995 | Mita |
| 5,510,203 A | 4/1996 | Hamada et al. |
| 5,558,960 A * | 9/1996 | Mitchell .................... 429/205 |
| 5,639,571 A * | 6/1997 | Waters et al. ................ 429/71 |
| 5,641,589 A | 6/1997 | Grivel et al. |
| 5,756,227 A | 5/1998 | Suzuki et al. |
| 5,766,801 A | 6/1998 | Inoue et al. |
| 5,780,180 A | 7/1998 | Okamoto et al. |
| 5,981,101 A * | 11/1999 | Stone ........................ 429/100 |
| 5,981,108 A * | 11/1999 | Matsumura et al. ........ 429/233 |
| 5,985,483 A | 11/1999 | Verhoog et al. |
| 6,033,800 A | 3/2000 | Ichiyanagi et al. |
| 6,275,003 B1 | 8/2001 | Marukawa et al. |
| 6,304,057 B1 | 10/2001 | Hamada et al. |
| 6,312,851 B1 | 11/2001 | Fukuda et al. |
| 6,326,103 B1 | 12/2001 | Ido et al. |
| 6,455,190 B1 | 9/2002 | Inoue et al. |
| 6,551,741 B1 | 4/2003 | Hamada et al. |
| 6,818,343 B1 * | 11/2004 | Kimoto et al. ............... 429/99 |
| 2003/0049525 A1 * | 3/2003 | Hottori et al. .............. 429/144 |
| 2003/0049526 A1 | 3/2003 | Hottori et al. |
| 2003/0118898 A1 | 6/2003 | Kimoto et al. |

FOREIGN PATENT DOCUMENTS

| | | |
|---|---|---|
| EP | 0817287 | 1/1998 |
| EP | 834952 A2 | 4/1998 |
| EP | 1081784 | 3/2001 |
| JP | 61-45571 | 3/1986 |
| JP | 3291867 | 12/1991 |
| JP | 6-215804 | 8/1994 |
| JP | 7-85847 | 3/1995 |
| JP | 8-321329 | 12/1996 |
| JP | 9-120809 | 5/1997 |
| JP | 9219181 | 8/1997 |
| JP | 10-106637 | 4/1998 |
| JP | 10189062 | 7/1998 |
| JP | 11-238530 | 8/1999 |

* cited by examiner

BATTERY PACK

This is a Divisional Application of application Ser. No. 09/684,250 filed Oct. 6, 2000, issued on May 27, 2003, as U.S. Pat. No. 6,569,561.

BACKGROUND OF THE INVENTION

1. Technical Field of the Invention

The present invention relates to a battery pack constructed with a plurality of battery modules that are respectively constituted by unitizing a plurality of cells.

2. Description of Related Art

It has been the practice to constitute a battery pack, in order to achieve a necessary output power, when employing rechargeable batteries. In a battery pack, generally, a plurality of battery modules, each being constituted by connecting a plurality of cells in series and bonding them into a unitized body, are arranged in parallel and mutually connected in series.

Figure 11:
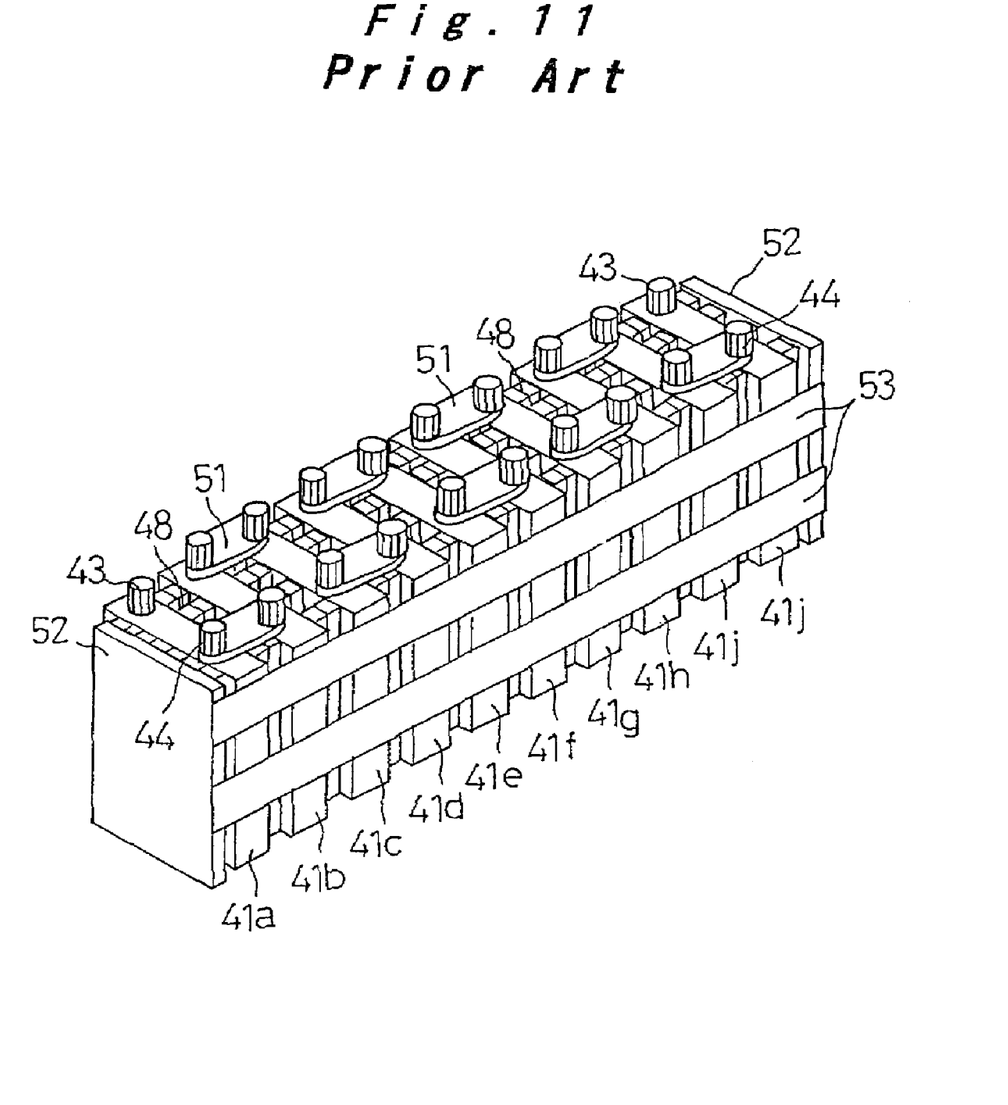
FIG. 11 is an external perspective view of a conventional battery module.

FIG. 11 shows a conventional battery module made by connecting a plurality of cells and coupling them together as one. In this battery module, a plurality of cells 41 (41a to 41j) are arranged side by side, with the long lateral walls of their cell cases opposite each other. End plates 52 are arranged against the outside of the cells 41a and 41j at both ends, and the group of cells and the two end plates 52 are bound together with binding bands 53 so as to couple the cells together as one piece.

Figure 12:
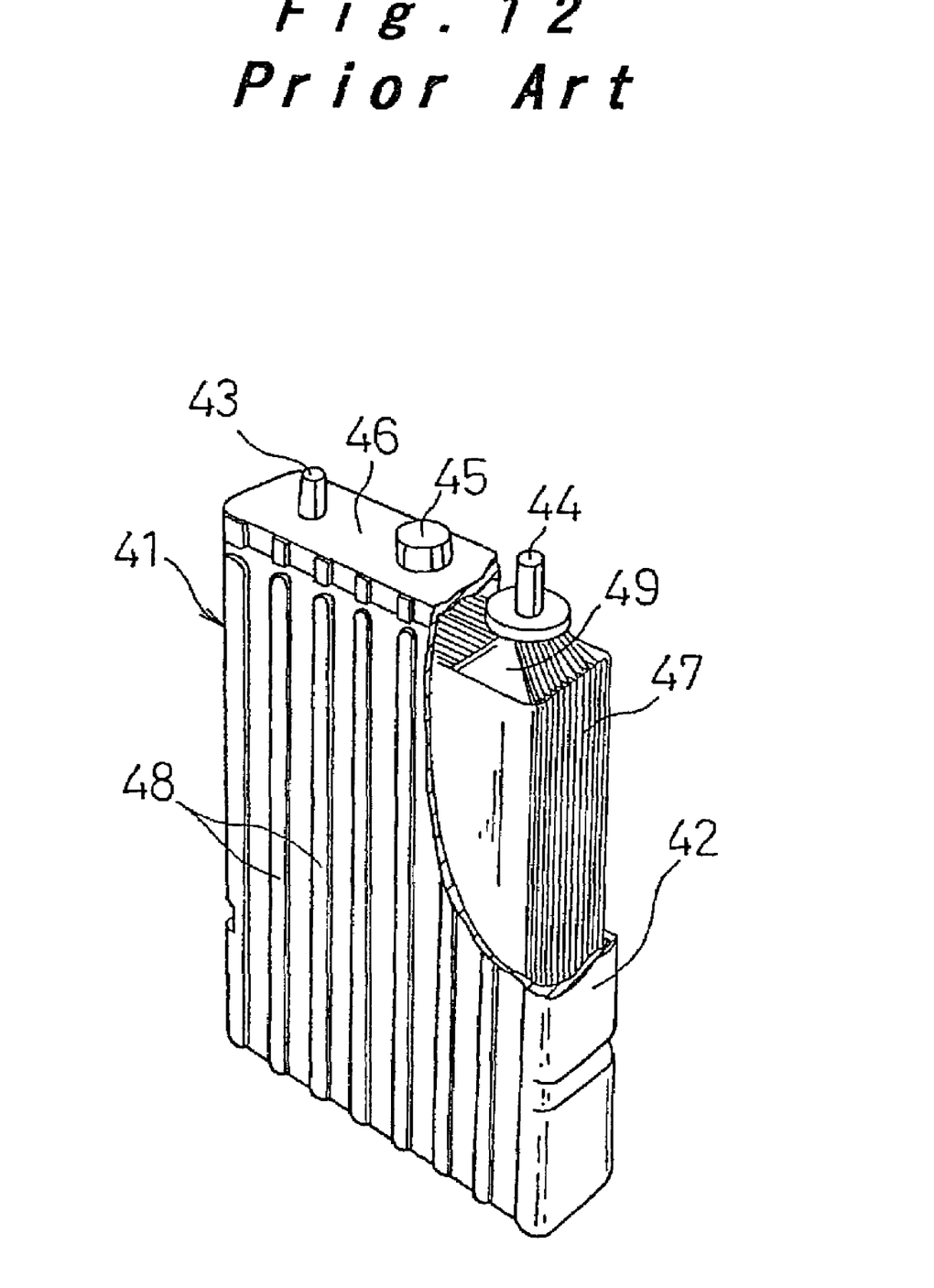
FIG. 12 is a partially cutaway perspective view of a cell of the same conventional example.

For the cells 41, as shown in FIG. 12, an electrode plate group 47, comprising positive electrode plates and negative electrode plates layered with intervening separators, thereby constituting elements for electromotive force, is accommodated in a cell case 42 together with a liquid electrolyte, and the open end of the cell case 42 is closed with a lid 46 provided with a safety vent 45. From the upper end at one side of the positive electrode plates forming the electrode plate group 47, leads 49 extend upward and are connected to a positive electrode terminal 43 above them, and similarly, from the upper end of the other side of the negative electrode plates, leads 49 extend upward and are connected to an negative electrode terminal 44 above them. The positive electrode terminal 43 and the negative electrode terminal 44 are attached to the lid 46.

The positive electrode terminals 43 and negative electrode terminals 44 of coupled neighboring cells 41 are connected by connection plates 51, thereby connecting all cells 41 in series. When the cell cases 42 are coupled, ribs 48, which protrude vertically from the long lateral walls of the cell cases 42, are abutted against each other, forming coolant passages running in the vertical direction along the long lateral walls of the cell cases 42 in the space between ribs 48, so that the cells 41a to 41j are cooled by flowing air through these coolant passages.

In the battery pack employing such battery module as described above, because the plurality of cells 41 (41a-41j) are tightly bound together, if the internal pressure rises in some of the cells 41 due to generation of gas induced by, for example, overcharging, whereupon the cell cases 42 of these cells 41 expand, then the other cells adjacent the expanding cells become depressed in order to accommodate the expansion. Thus the internal pressures in each of the cells 41 are maintained substantially uniform in each of the battery modules. Therefore, as far as one battery module is concerned, even if there is an imbalance in the internal pressure between various cells 41 whereupon the output characteristics and the life of some cells deteriorate, the output characteristics and the service life of the battery module as a whole are relatively unaffected.

However, when a plurality of the battery modules as shown in FIG. 11 are bound together to constitute a battery pack, the cells 41 of one battery module will not be bound in tight contact with the cells 41 of adjacent battery module, and there will be variations in the internal pressure between the cells 41 of different battery modules. Therefore, it can happen that the internal pressure in the cells 41 of some battery modules become higher than that in the cells 41 of the other battery modules, and when this battery pack is taken as a whole, the output characteristics and service life of the battery pack may deteriorate because of degradation in the output characteristics or service life of some of the battery modules.

Moreover, the battery module shown in FIG. 11 is constituted by unitizing a plurality of cells, and in order to constitute a battery pack, a plurality of such battery modules are coupled together. Accordingly, the battery pack becomes relatively bulky with a complex structure and heavy weight. There is thus the problem that the battery pack as a whole has relatively low percentages of output by volume and by weight.

The higher the power output of each cell is, the higher the heat generation in the cell becomes. When the temperature in the cell rises, the internal pressure rises accordingly due to expansion of electrode plates or generation of gas, which adversely affects the output characteristics and service life of the cell. The battery pack therefore needs to meet the requirements for high cooling performance. However, with the construction of the prior art battery pack constituted with battery modules shown in FIG. 11, it is hardly possible to further improve the cooling performance, because the cell cases 42 of each cell 41 are made of synthetic resin having low thermal conductivity, and the cells are cooled by passing air through the coolant passages between the cells.

SUMMARY OF THE INVENTION

In view of the problems in the prior art described above, it is an object of the present invention to provide a battery pack wherein variations in the internal pressure between various cells of various battery modules are eliminated, so that the output characteristics and service life of the battery pack are not affected by unbalanced internal pressure in some cells or battery modules. A further object of the present invention is to provide a battery pack having higher percentages of power output by volume and by weight and excellent cooling performance.

A battery pack according to the present invention comprises:

a plurality of battery modules, each being constructed of an integral battery case which is constituted by forming a plurality of prismatic cell cases into a unitized body, wherein positive electrode plates and negative electrode plates laminated alternately upon one another with intervening separators are respectively accommodated in each of the cell cases, thereby constituting a plurality of cells, the plurality of cells being electrically connected in series, the plurality of battery modules being arranged in a direction in which the electrode plates are laminated within each cell, in a condition with coolant passages formed between the battery modules;

end plates arranged at both ends in the direction of adjacent arrangement of the battery modules; and means for binding the plurality of battery modules and the end plates together.

In the battery pack of the present invention, all of the cells that constitute the battery pack are bound together in tight contact with each other, and thereby, variations in the internal pressure of all of the cells can be eliminated. Therefore, there is no risk that some of the cells or battery modules deteriorate because of the expansion of electrode plates or increased internal pressure, resulting in degradation of the output characteristics or service life of the battery pack as a whole. Thereby, the output characteristics and service life of the battery pack can be improved and, when taken as a whole, the volume density and weight density of power output of the battery pack are increased.

Other and further objects, features and advantages of the invention will be apparent more fully from the following description.

DESCRIPTION OF PREFERRED EMBODIMENTS

One embodiment of a battery pack according to the present invention is described below with reference to FIG. 1 to FIG. 6.

Figure 1:
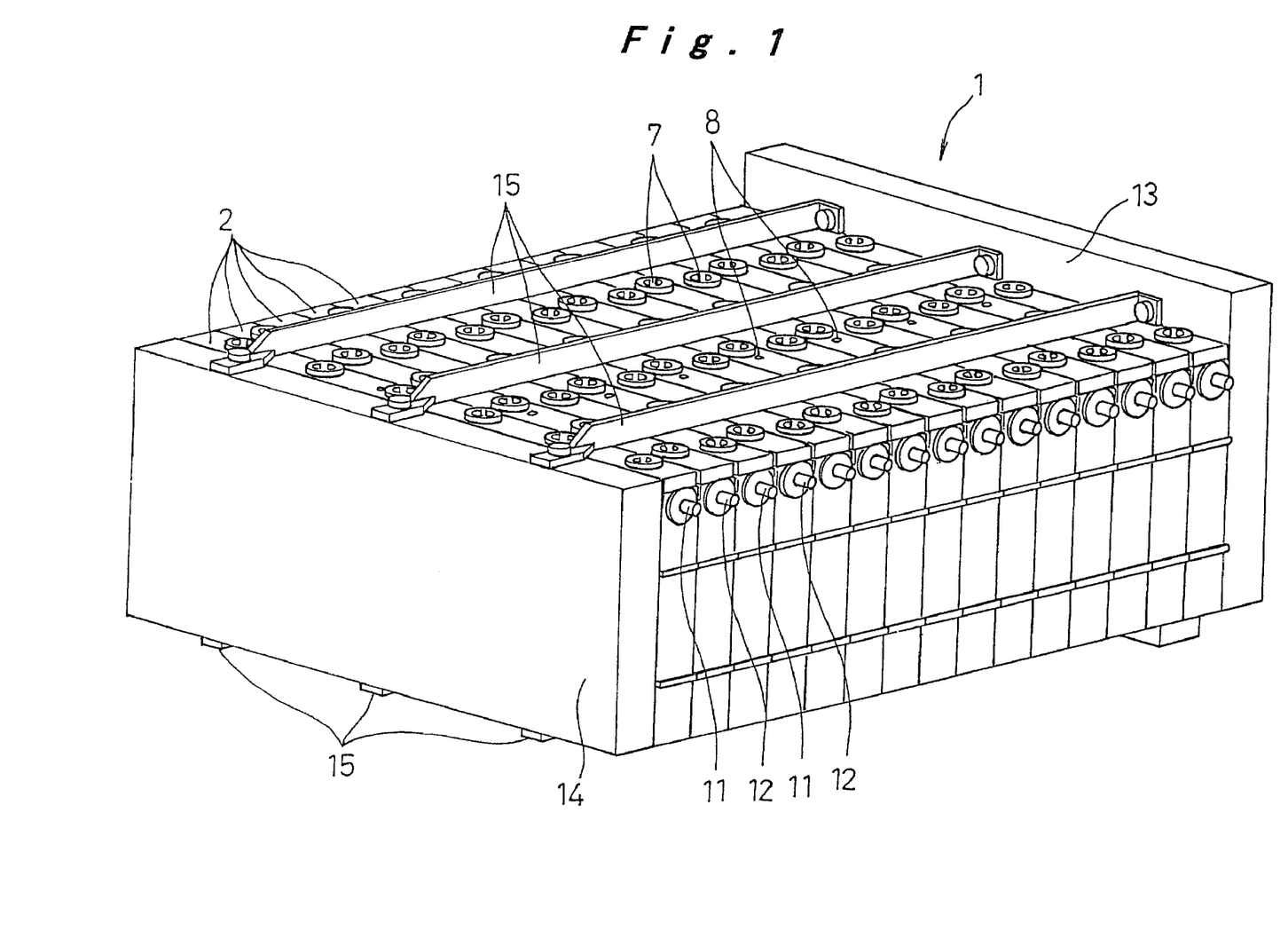
FIG. 1 is one perspective view of a battery pack according to one embodiment of the present invention.
Figure 2:
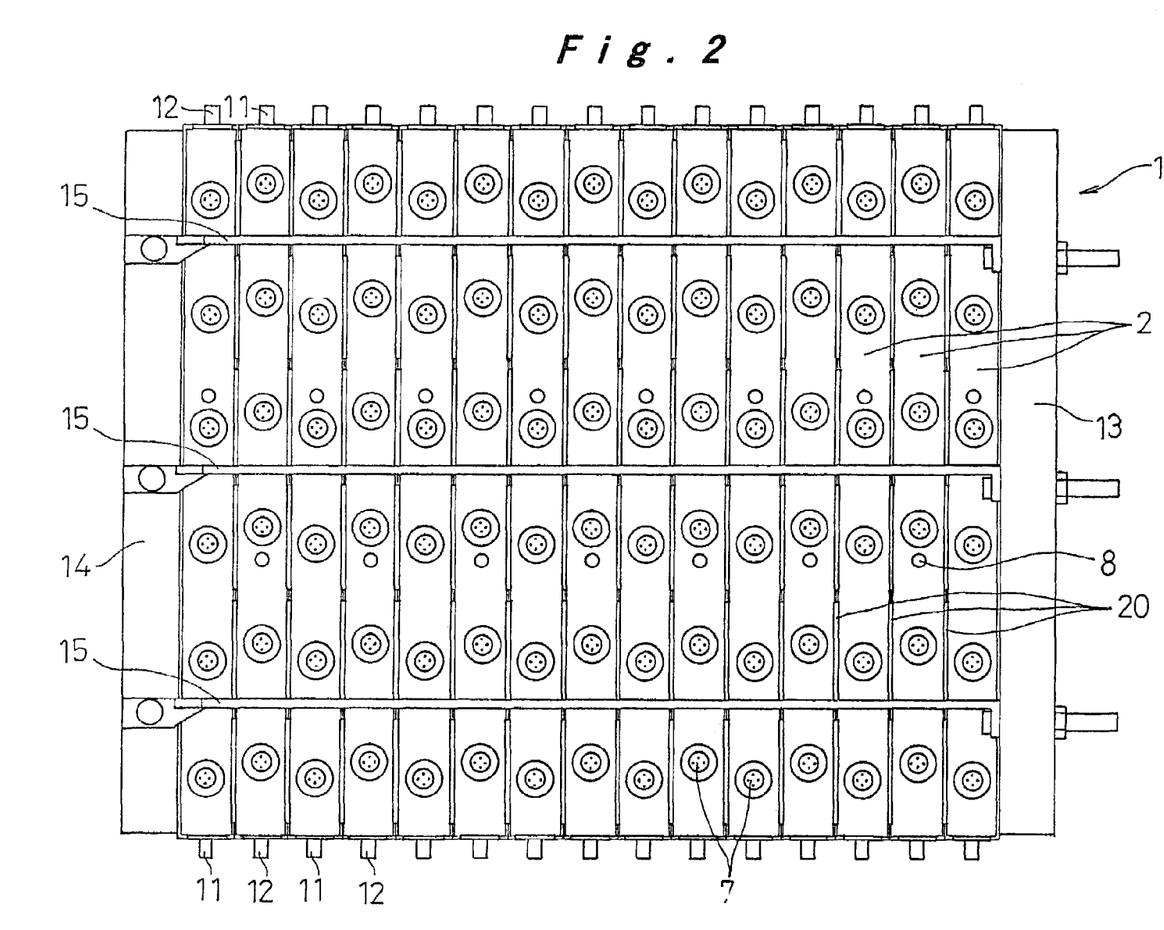
FIG. 2 a plan view of a battery pack of this embodiment.

In FIG. 1 and FIG. 2, a battery pack 1 according to this embodiment is constituted such that it can conveniently be employed as the drive power source for an electric vehicle and is constituted by arranging adjacent each other a plurality (in the example illustrated, 15) of prismatic battery modules 2 of flat plate shape comprising nickel metal hydride batteries. Positive electrode and negative electrode connecting terminals 11, 12 project at the upper ends of both end faces in the direction of elongation of battery modules 2, the positive electrode and negative electrode connecting terminals 11, 12 of battery modules 2 being adjacently arranged so as to be alternately in opposite directions; thus, battery modules 2 are connected in series by sequential mutual connection of adjacent connecting terminals 11, 12. The battery pack 1 is constituted as a unitized body by disposing end plates 13, 14 at both ends in the direction of adjacent arrangement of the battery modules 2, their upper ends and lower ends being tied together by a plurality of binding bands 15 respectively arranged with a suitable separation.

Figure 3:
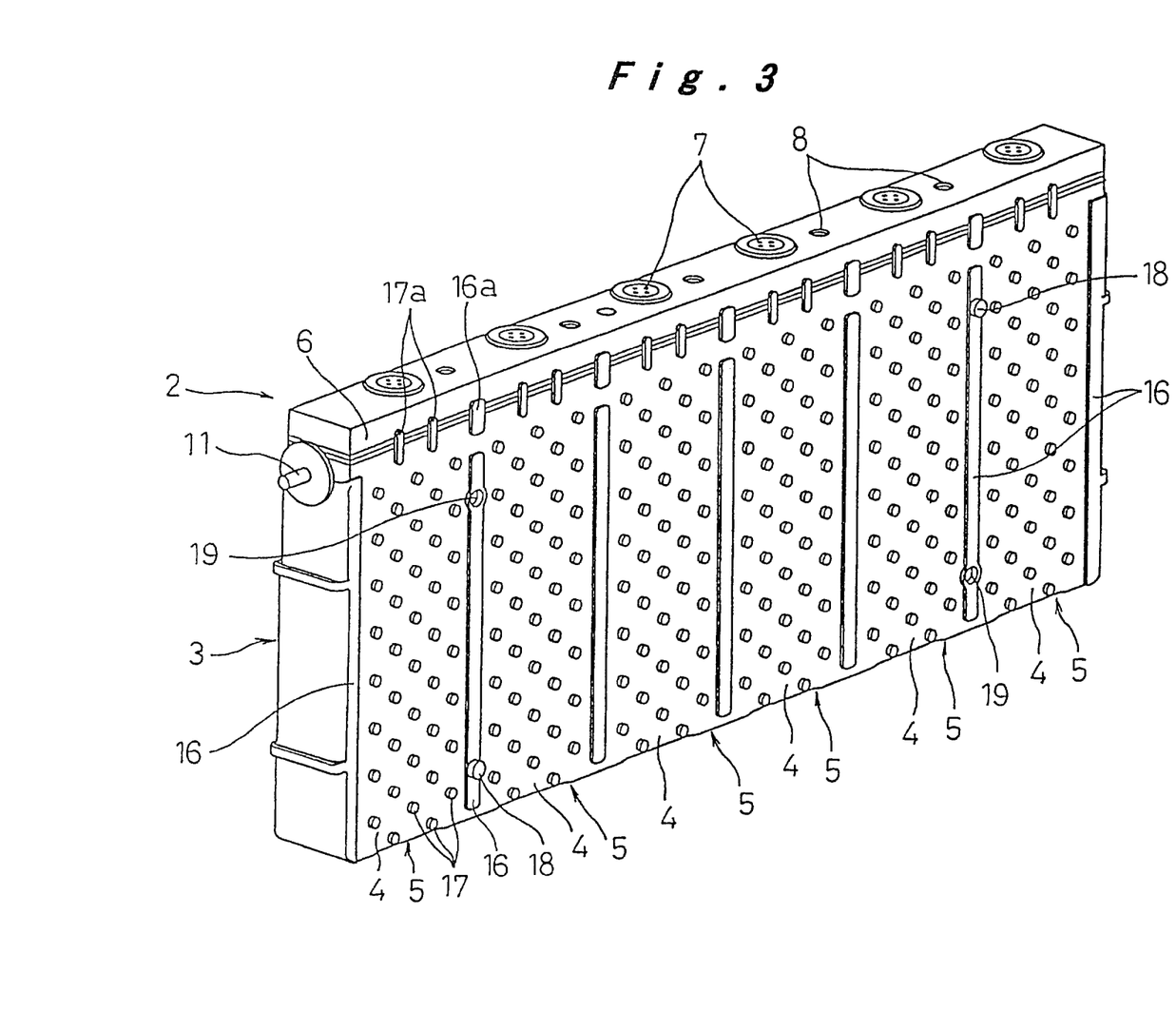
FIG. 3 is a perspective view of a battery module according to this embodiment.
Figure 4:
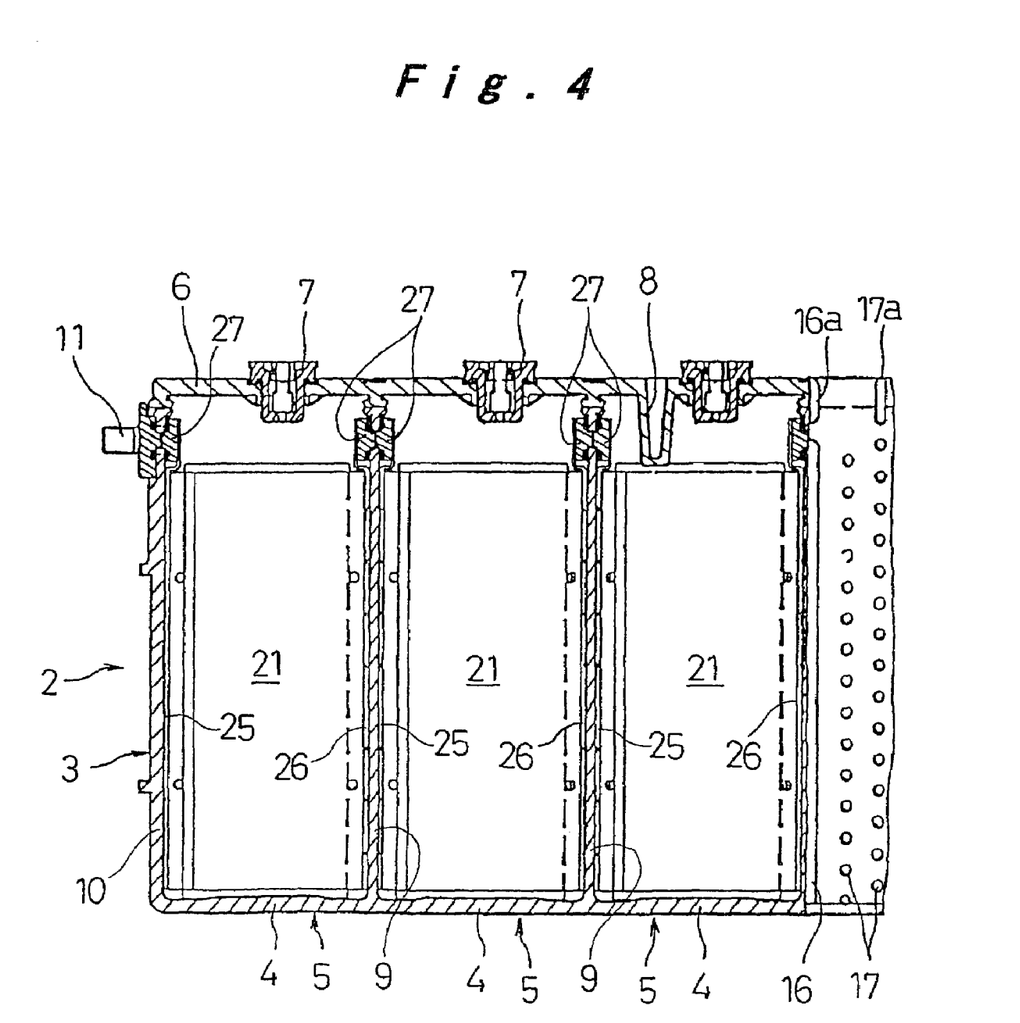
FIG. 4 is a partial lateral cross-sectional view of the battery module.

As shown in FIG. 3 and FIG. 4, a battery module 2 is constituted by an integral battery case 3 formed by mutually unitarily linking a plurality (in this embodiment, six) of rectangular prismatic cell cases 4 having short lateral walls and long lateral walls, the short lateral walls being shared as partitions 9 between the cell cases 4, 4, and the outside short lateral walls of the cell cases 4 at both ends constituting the end walls 10 of the integral battery case 3.

Cells 5 are constituted by accommodating electrolyte and electrode plate groups 21 consisting of a large number of positive electrode plates and negative electrode plates within cell cases 4 parallel with the long lateral walls and stacked in the direction of the short lateral walls with intervening separators. A battery module 2 is constituted by connecting these six cells 5 in series within the integral battery case 3, connecting terminals 11, 12 being connected to the cells 5 at both ends.

The upper end of the integral battery case 3 is closed by a lid 6 that is integrally joined thereto. In this lid 6 there is arranged a safety vent 7 for releasing pressure when the internal pressure of the cells 5 reaches a fixed value. Also, temperature detection holes 8 fitted with temperature detection sensors for detecting the temperature of each cell are formed therein. The integral battery case 3 and the lid 6 are made of synthetic resin such as PP/PPE alloy.

The long lateral walls of the plurality of cell cases 4 together form the side faces of the integral battery case 3, on which rib-shaped projections 16 extending vertically in positions opposite partitions 9 and end walls 10 of the two side ends of cell cases 4 are provided. Further, a large number of comparatively small circular projections 17 are provided in a matrix arrangement with a suitable pitch between rib-shaped projections 16. 16. The height of the rib-shaped projections 16 opposite the partitions 9 and end walls 10 of the cells is set smaller than the height of the circular projections 17.

It is of course possible to provide, instead of circular projections 17, a plurality of parallel ribs at suitable intervals between the rib-shaped projections 16. Furthermore, coupling ribs 16a and 17a having the same height as the rib-shaped projections 16 and the circular projections 17 are formed on the side walls of the upper edge of the integral battery case 3 and the side walls of the lid 6, such as to bridge across the side walls of the cell cases 4 and the lid 6, at positions corresponding to an extension of the rib-shaped projections 16 and the circular projections 17.

A plurality of protrusions 18 and indentations 19, for positioning and fitting together integral battery cases 3 when a plurality of battery modules 2 are arranged in parallel with their side walls abutted on each other, are arranged at an upper portion and a lower portion of the outer surface of the two rib-shaped projections 16 near both ends of the side wall of the integral battery case 3. These protrusions 18 and indentations 19 are disposed on both sides of the integral battery case 3 symmetrical with respect to the centerline in the lengthwise direction of the integral battery case 3.

When a plurality of battery modules 2 are arranged in a row in parallel to constitute a battery pack, the rib-shaped projections 16, the circular projections 17, and the coupling ribs 16a and 17a abut each other and form coolant passages 20 between the opposing side faces of the battery modules 2 for cooling the cells 5 effectively and uniformly.

Figure 5:
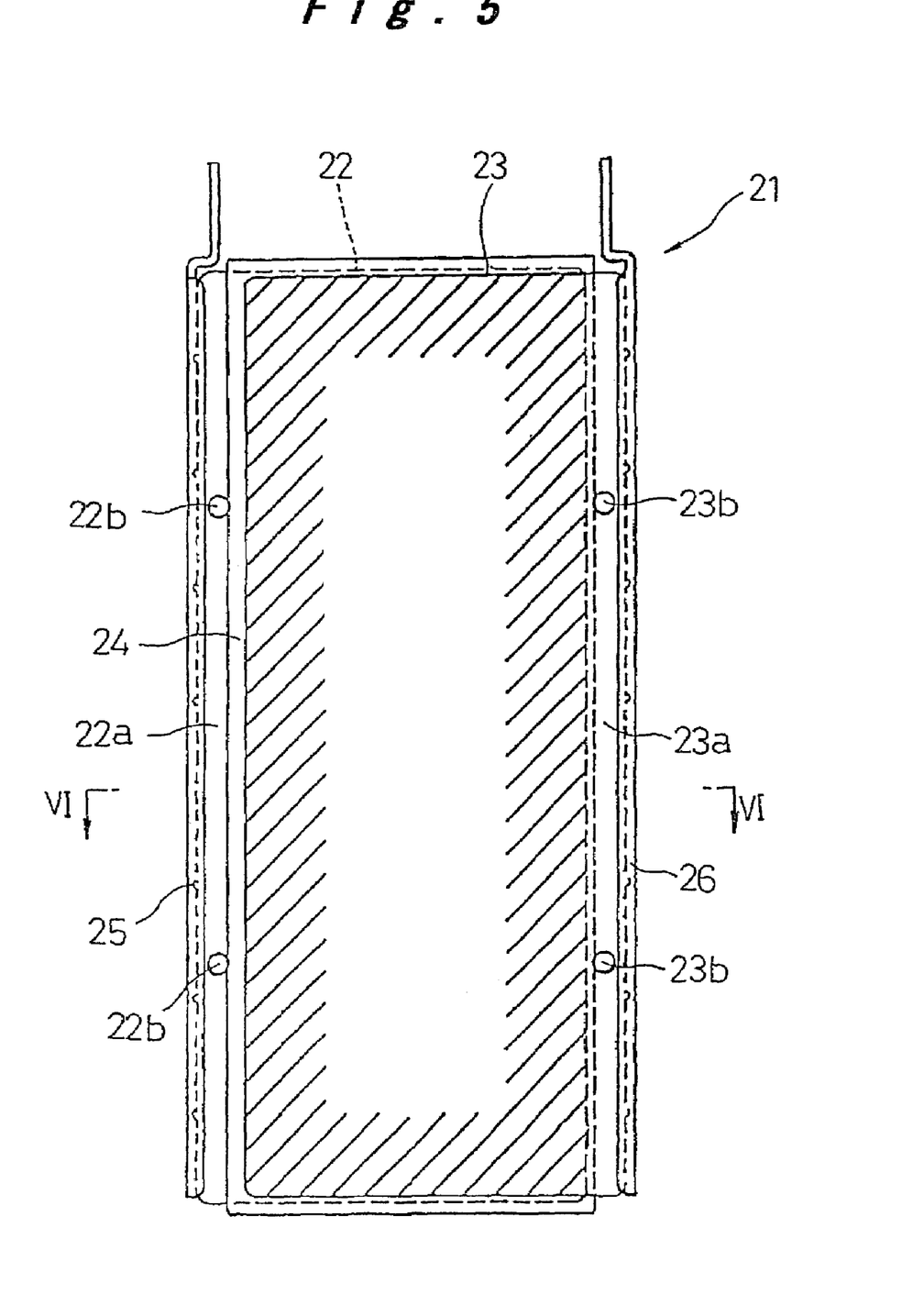
FIG. 5 is a front view of an electrode plate group in the same embodiment.
Figure 6:
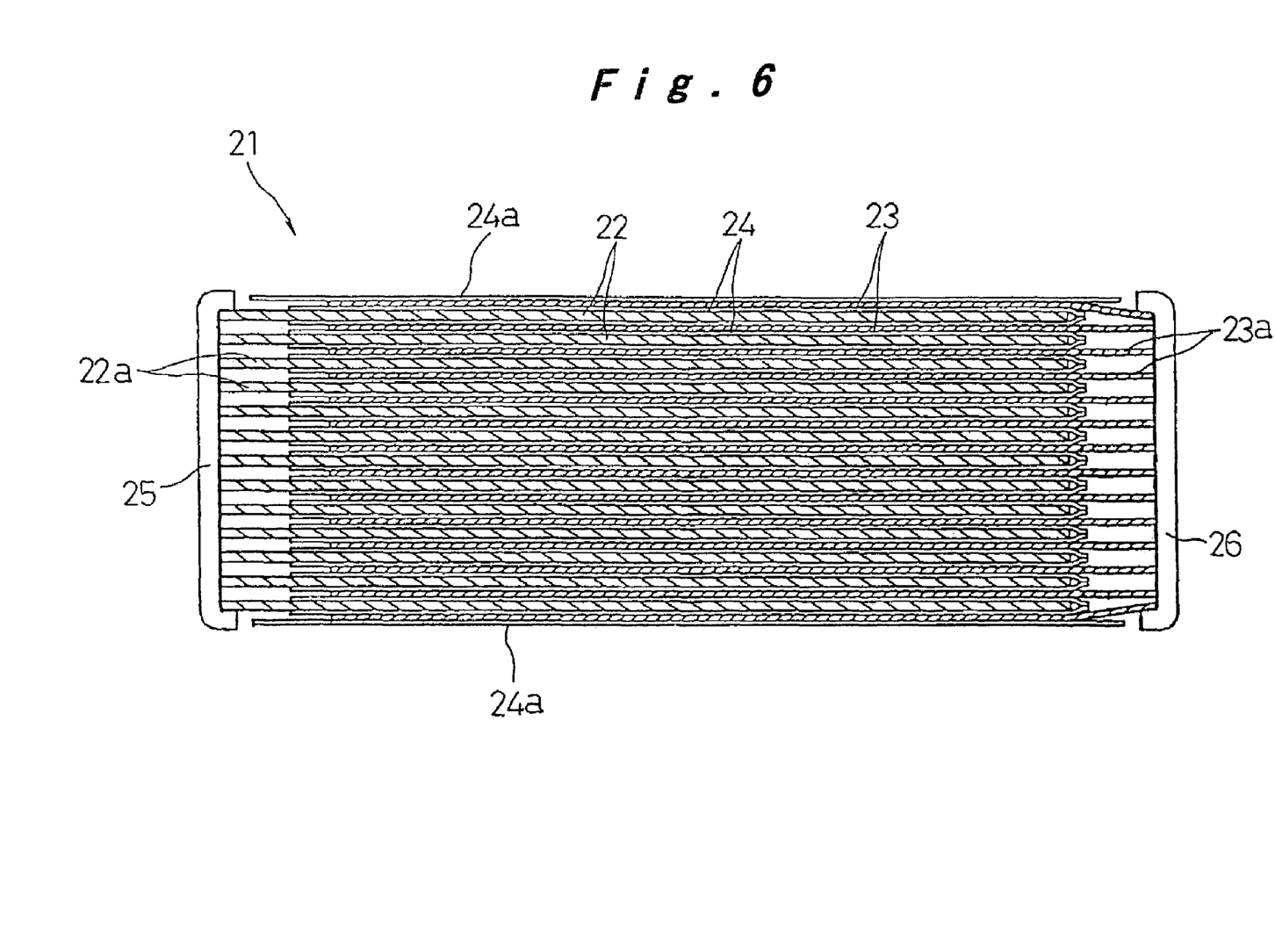
FIG. 6 is a cross-sectional view taken in the direction of the arrows along the line VI-VI in FIG. 5.

The electrode plate groups 5 that are accommodated within the cell cases 4 as the elements for electromotive force of the cells 5 are explained in detail with reference to FIG. 5 and FIG. 6. A large number of positive electrode plates 22 and negative electrode plates 23 are arranged alternately, and the positive electrode plates 22 are covered with separators 24 in the form of a bag having an opening on one side. The positive electrode plates 22 and the negative electrode plates 23 are stacked upon one another with separators 24 therebetween, thereby constituting the electrode plate group 21. In FIG. 5, the region where the positive electrode plates 22 and the negative electrode plates 23 oppose each other with the intervening separators 24 and generate electric power is indicated by oblique lines. Numeral 24*a* represents outer separators arranged on the outer faces of the electrode plate group 21 between collector plates 25, 26 at opposite ends.

The lateral edges of the group of positive electrode plates 22 protrude beyond the group of negative electrode plates 23 on one side, and the lateral edges of the group of negative electrode plates 23 protrude beyond the group of positive electrode plates 22 on the opposite side, and these protruding lateral portions form the lead portions 22*a* and 23*a*, to the lateral ends of which collector plates 25 and 26 are welded, respectively. Numerals 22*b*, 23*b* denote pairs of positioning holes formed in the lead portions 22*a* and 23*a* at a suitable distance from the top and the bottom thereof for aligning the lateral ends of the lead portions 22*a* and 23*a* when welding the collector plates 25, 26 thereto.

For connecting neighboring cells 5, 5, as shown in FIG. 4, connectors 27 are provided to the upper edges of respective collector plates 25, 26, these connectors 27 being able to fit into connection holes formed at upper edges of the partitions 9 between neighboring cell cases 4. The connectors 27 thus put through a connection hole and butted each other are welded together so as to connect the collector plates 25 and 26 of adjacent cells 5, 5. Connectors 27 are also provided to the collector plates 25, 26 of two cells at opposite ends of the battery module, these being fitted into connection holes formed in the end walls 10, and welded with respective connecting terminals 11, 12.

In the battery pack 1 of the present invention described above, a plurality of cell cases 4 are formed into a unitized body as the integral battery case 3, wherein each cell case 4 accommodates therein the electrode plate group 21 and constitutes a cell 5, a plurality of these cells 5 being connected in series to constitute a battery module 2. A plurality of such battery modules 2 are arranged in parallel in the direction in which the electrode plates within each cell are laminated, with a pair of end plates 13, 14 being arranged at opposite ends of these battery modules, and they are all bound together with binding bands 15 to be an integral body. In this state, all of the cells 5 that constitute the battery pack 1 are bound together in tight contact with each other, and thereby, variations in the internal pressure of all of the cells 5 can be eliminated. Therefore, there is no risk that some of the cells 5 or battery modules 2 deteriorate because of the expansion of electrode plates or increased internal pressure, resulting in degradation of the output characteristics or service life of the battery pack 1 as a whole. Thereby, the output characteristics and service life of the battery pack 1 can be improved and, when taken as a whole, the volume density and weight density of power output of the battery pack are increased.

As described above, a battery module 2 is constituted by forming a plurality of prismatic cell cases 4 into a unitized body as the integral battery case 3 wherein the cell cases are arranged side by side so that their short lateral walls are shared by adjacent cells as partitions 9 therebetween, and the battery pack 1 is constructed with a plurality of such flat battery modules 2 stacked upon one another. Therefore, while the battery pack has a very compact structure, it exhibits excellent cooling performance, because all of the cells 5 are arranged such that their long lateral walls are exposed to the coolant passages 20 between the battery modules 2. Thus the output characteristics and service life of the battery pack 1 can be improved.

The coolant passages 20 are formed by abutting the leading ends of the rib-shaped projections 16 and circular projections 17 that are protruded on opposite faces of the integral battery cases 3. Passages for flowing a cooling medium that have large flow path area and heat conducting area can thus be formed between battery modules with such a simple structure, whereby high cooling performance can be attained at low cost.

The height of the rib-shaped projections 16 that are positioned opposite the partitions 9 between the cells 5 is set lower than the height of the circular projections 17. Therefore, even when there is variation on the plus side in the width of the integral battery case 3 of battery module 2, such can be accommodated by elastic deformation of side walls of the integral battery case 3, and, at the portions corresponding to the partitions 9, by the gap formed between the opposed rib-shaped projections 16. Therefore, the integral battery case 3, at its portions corresponding to the partitions 9 between each two cells, receives no excessive compression load, and as a result, the binding load of the whole battery pack is prevented from becoming excessive.

Next, another embodiment of the present invention will be described with reference to FIG. 7 to FIG. 9. In the following description of this embodiment, the structural elements that are identical to those in the foregoing embodiment described above are given the same reference numerals, the description thereof being omitted, and only the differences explained.

In the foregoing embodiment described above, a plurality of battery modules 2 are arranged in parallel, with end plates 13, 14 being abutted at opposite ends of these battery modules 2, and coupled together by tying them with binding bands 15 such that coolant passages 20 are formed between adjacent battery modules 2, so that the cells are cooled by flowing cooling air through these coolant passages. In this embodiment, the plurality of battery modules 2 are simply arranged in parallel within a water cooling box 31, whereby not only the battery modules 2 are unitized, but also they are cooled by a flow of water therein.

Figure 7:
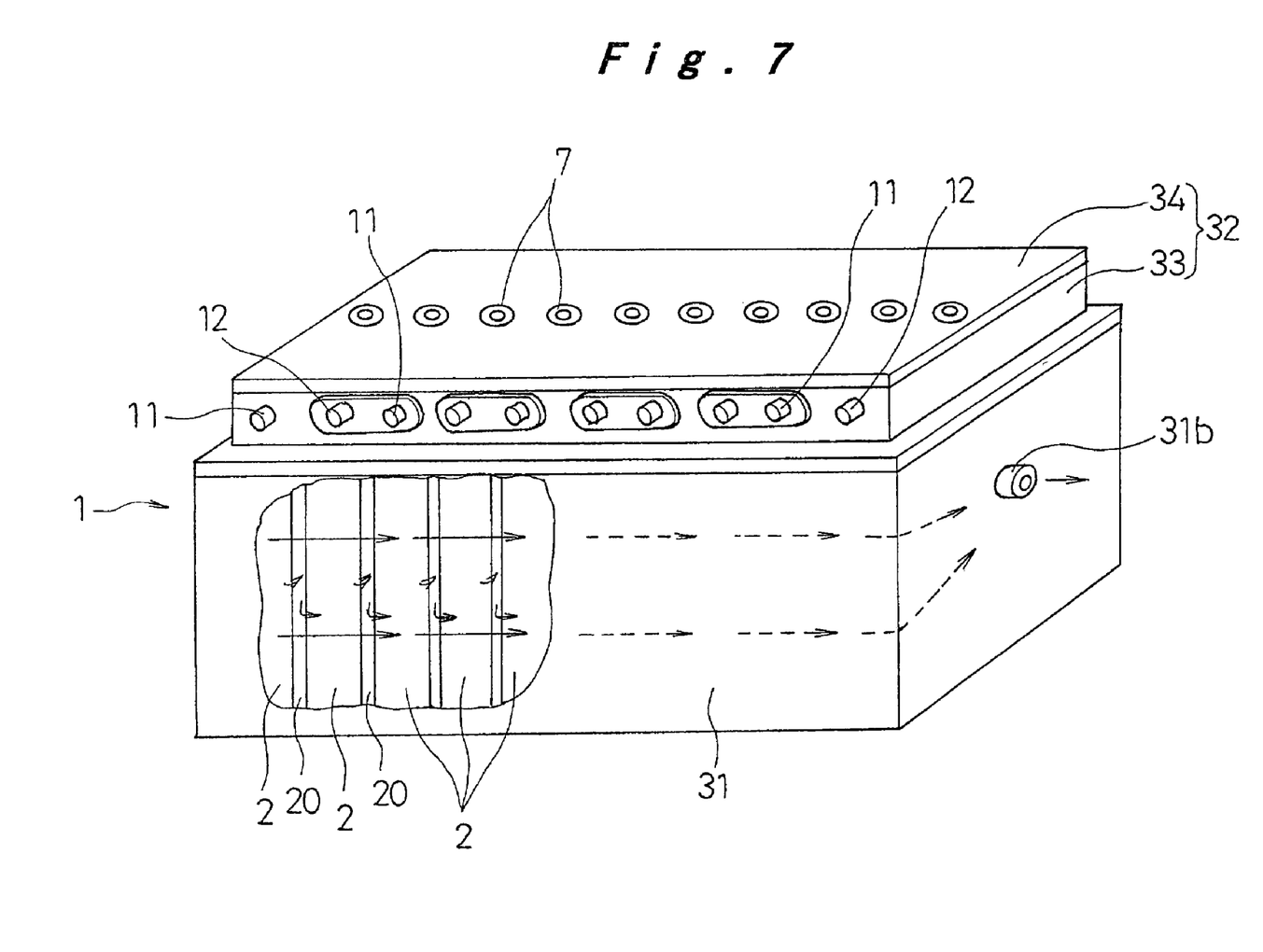
FIG. 7 is a perspective view of a battery pack according to another embodiment of the present invention.
Figure 8:
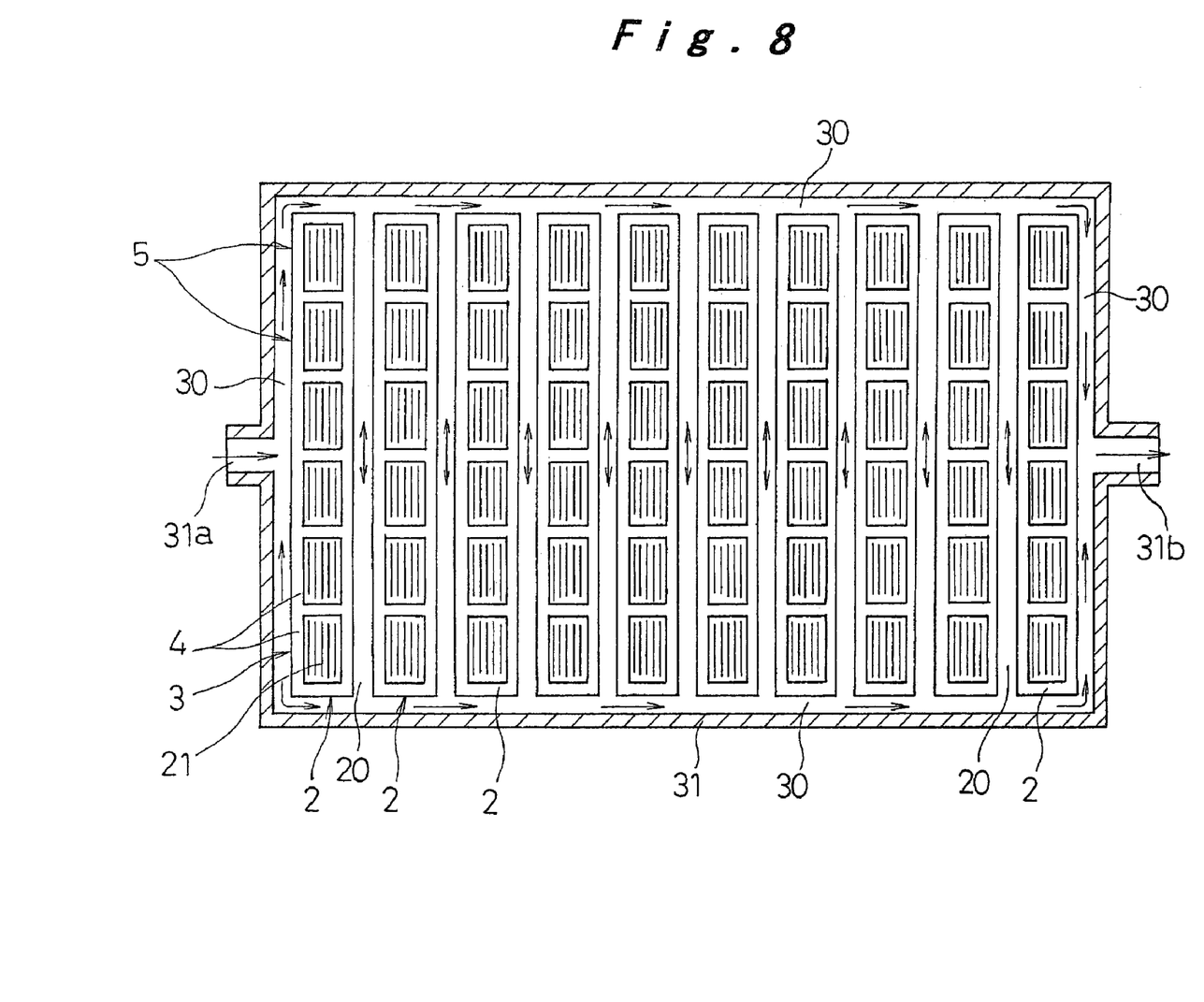
FIG. 8 is a cross-sectional top plan view of the battery pack.
Figure 9:
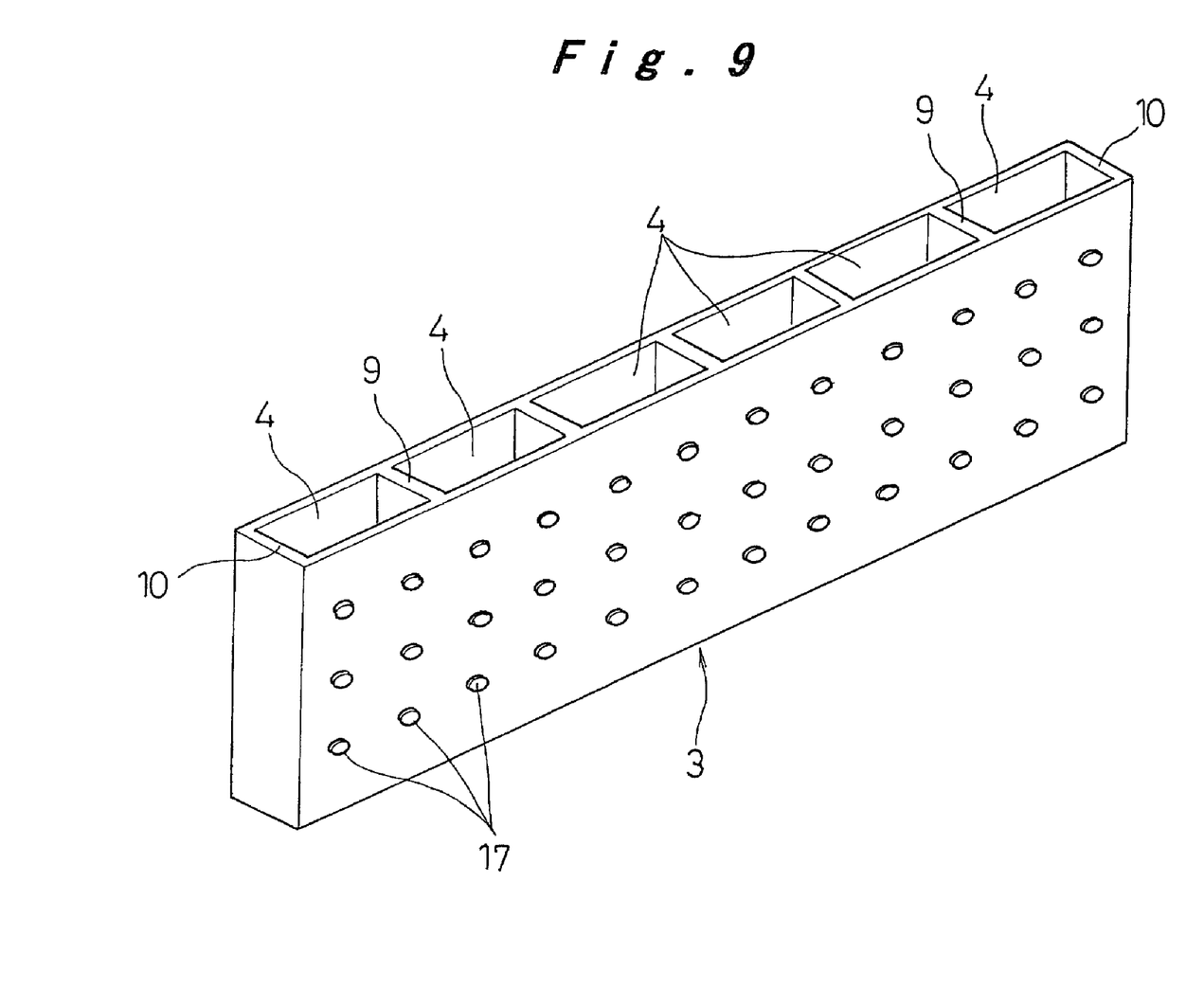
FIG. 9 is a perspective view of an integral battery case in this embodiment.

Referring to FIG. 7 and FIG. 8, the water cooling box 31 consists of a box with an upper open end. A plurality of integral battery cases 3 that are constituted by forming a plurality of prismatic cell cases 4 into an integral body such that the short lateral walls of the cell cases are shared between adjacent cell cases as partitions, as shown in FIG. 9, are arranged in parallel within this box. Coolant passages 20 are formed between each two adjacent integral battery cases, and also, a cooling water passage 30 is formed around the plurality of battery modules 2, as shown in FIG. 8. The upper open end of the water cooling box 31, as well as the upper open ends of the plurality of integral battery cases 3, are closed hermetically with a cover 32 comprising an upper frame 33 and a lid 34.

The upper frame 33 of the cover 32 constitutes the upper end parts of the plurality of cell cases 4 of each battery module 2. Therefore, the upper ends of each of the battery modules 2 extend above the upper end of the water cooling box 31. Electrode plate groups 21 are accommodated in each of the cell cases 4 thereby constituting each cell 5, as can be seen from FIG. 8. The upper frame 33 is provided with an inner connection structure similar to that shown in FIG. 4 for connecting adjacent cells 5, 5 in series. On the side faces of the upper frame 33, as shown in FIG. 7, positive and negative electrode connecting terminals 11, 12 are disposed alternately, so that the battery modules 2 can be mutually connected in series by means of connection modules. The plurality of cell cases 4 in each of the battery modules 2 are mutually communicated within the upper frame 33, and, safety vents 7, one each for every battery module 2, are arranged in the lid 34.

The integral battery case 3 in this embodiment is formed with a large number of circular projections 17 arranged in a matrix fashion on the opposite long lateral walls, so that, when a plurality of integral battery cases 3 are arranged adjacent each other, these circular protrusions 17 abut each other, thereby forming coolant passages 20 for allowing cooling water to flow between the integral battery cases 3 along a longitudinal direction of the long lateral walls of the integral battery case 3. A cooling water inlet 31a and an outlet 31b are respectively formed at opposite ends of the cooling water box 31. Thus, cooling water introduced from the inlet 31a flows through the cooling water passage 30 and the coolant passages 20 as indicated by the arrows in FIG. 7 and FIG. 8, and is discharged from the outlet 31b.

According to this embodiment, cooling water is caused to flow within the cooling water box 31 through the coolant passages 20 between the battery modules 20, with which each of the cells 5 of each battery module 2 can be reliably and efficiently cooled. High cooling performance can thus be attained and higher power output achieved. Since the coolant passages 20 are formed only with the circular projections 17, the cooling water can be caused to flow along the direction of arrangement of the cells in each of the battery modules 2, and, the flow-path cross-sectional area and heat-transmission area of the coolant passages can be made large. Thus high cooling performance can be attained with such a simple structure at low cost. Moreover, since the connecting terminals 11, 12 of each battery module 2 are disposed above the cooling water box 31, these connecting terminals 11, 12 can be connected with each other in series by means of connection modules readily and safely.

Figure 10A:
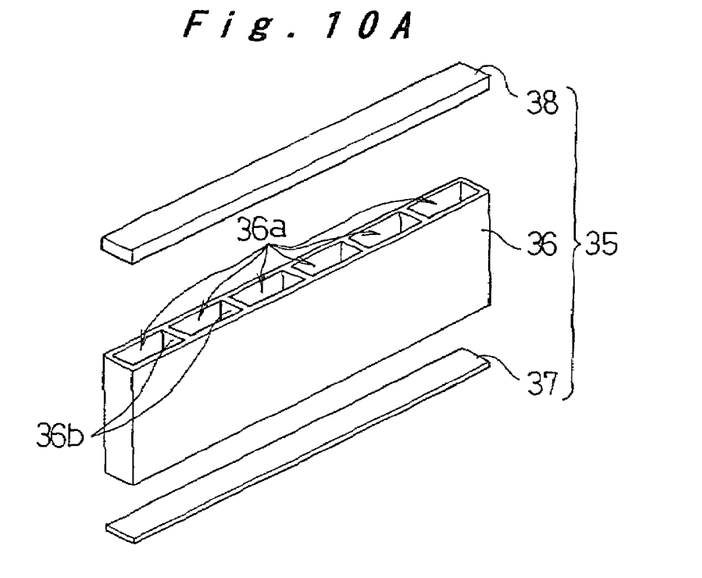
FIG. 10A is an exploded perspective view schematically illustrating a battery module according to a yet another embodiment of the present invention.
Figure 10B:
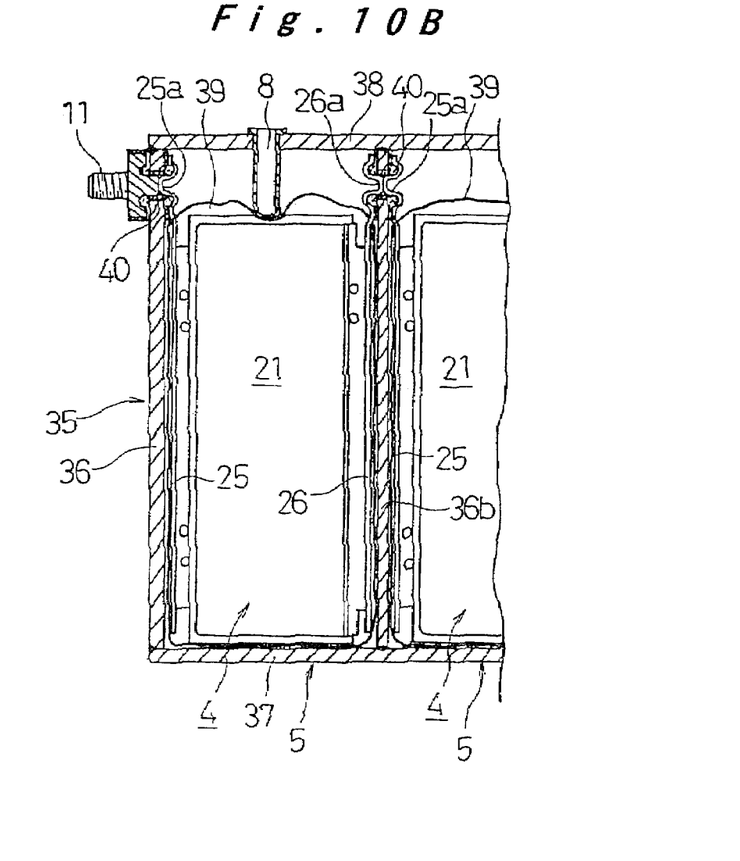
FIG. 10B is a partial lateral cross-sectional view of same.

Next, yet another embodiment of the present invention will be described with reference to FIGS. 10A and 10B. In the foregoing embodiments, integral battery cases 3 made of synthetic resin are used. In this embodiment, the integral battery case 35 comprises a flat metal body 36 made of aluminum alloy and formed by extrusion, having a plurality of through holes 36a or divided spaces, of which cross-section is rectangular, arranged side by side in the lengthwise direction as shown in FIG. 10A. As can be seen from FIG. 10B, a bottom plate 37 is coupled to the lower end of this metal body 36, and the upper open end of the metal body 36 is hermetically closed by a cover plate 38. Electrode plate groups 21, together with electrolyte, are respectively accommodated in each of the divided spaces 36a in a state that they are covered with bag-shaped insulating films 39. The collector plates 25, 26 are formed with respective protruded connection parts 25a, 26a at their upper ends, which extend through the insulating films 39. These protruded connection parts 25a, 26a are abutted with each other or with connecting terminals 11 or 12 and welded together for achieving electrical connection between adjacent cells 5 or between the cells at opposite ends of a battery module and the connecting terminals 11 or 12. Insulating materials 40 are interposed between these protruded connection parts 25a, 26a and inner partition walls 36b of the metal body 36. A cylindrical temperature detection hole 8 is formed in the cover plate 38 such that its bottom reaches the upper end of the electrode plate group 21 of one cell. Further, although not shown, a safety vent is also mounted in the cover plate 38. Instead of using insulating films 39, the metal body 36 may be coated with an insulating material on its inner face, and an insulating material be disposed upon the bottom plate 37.

According to this embodiment, because the integral battery case 35 is made of metal such as aluminum having high heat conductivity, the cells 5 can be efficiently cooled by letting cooling air or water flow through the coolant passages 20. Also, thanks to higher strength of metal, the wall thickness of the battery case can be made thinner, whereby the heat conductivity on the long lateral walls of each cell case 4 can be further improved. Moreover, because the wall thickness can be made thinner while the pressure strength of the battery case is maintained, the volume of the electrode plate groups within each cell case 4 can be increased, thereby improving power output of the battery. Metal is much less permeable to water and gas as compared to resin, whereby water or gas can reliably be prevented from being permeated. Electrolyte will thus hardly dry out and service life of the battery is prevented from diminishing. Thus, power output of each cell 5 is increased, whereby high power output characteristics and long life of the entire battery pack 1 can be attained.

In this embodiment, one example was given in which the metal body 36 of the integral battery case 35 was prepared by extrusion. It is of course possible to fabricate such metal body by pressure die-casting or metal injection molding.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:
    a plurality of battery modules, each of said plurality of battery modules being constructed of an integral battery case which is constituted by mutually coupling a plurality of prismatic cell cases having short lateral walls and long lateral walls into a unitized body such that the short lateral walls of the cell cases are shared by adjacent cell cases as partitions;
    positive electrode plates and negative electrode plates laminated alternately upon one another with intervening separators to form electrode plate groups which are respectively accommodated in each of said cell cases, thereby constituting a plurality of cells, said plurality of cells being electrically connected in series; and
    a box for accommodating therein said plurality of battery modules arranged in a condition with coolant passages formed between the battery modules and extending along the long lateral walls of the prismatic cell cases.

2. The battery pack according to claim 1 wherein a plurality of protrusions are formed on opposite faces of the integral battery case of the battery module, and the battery modules are arranged such that said protrusions of one battery module are contacted with said protrusions of an adjacent battery module, whereby said coolant passages are formed between the battery modules.

3. The battery pack according to claim 1 wherein each of the battery modules has respective connecting terminals of positive and negative polarities at longitudinal opposite ends on an upper end portion of the battery module, said upper end portion of the battery module extending above an upper end of the box, so that said connecting terminals of the battery modules are connectable to each other in series.

4. A battery pack comprising:
a plurality of battery modules, each of said plurality of battery modules being constructed of an integral battery case which is constituted by mutually coupling a plurality of prismatic cell cases having short lateral walls and long lateral walls into a unitized body such that the short lateral walls of the cell cases are shared by adjacent cell cases as partitions;
positive electrode plates and negative electrode plates laminated alternately upon one another with intervening separators to form electrode plate groups which are respectively accommodated in each of said cell cases, thereby constituting a plurality of cells, said plurality of cells being electrically connected in series; and
a box for accommodating therein said plurality of battery modules arranged in a condition with coolant passages formed between the battery modules, wherein the integral battery case is constructed of metal, and each of the cells constituting the battery module accommodates therein the electrode plate groups enveloped in an insulating film.

5. A battery pack comprising;
a plurality of battery modules, each of said plurality of battery modules being constructed of an integral battery case which is constituted by forming a plurality of cell cases as a unitized body with common partition walls of the unitized body shared between adjacent ones of the cell cases;
elements for electromotive force forming electrode plate groups respectively accommodated in each of said cell cases, thereby constituting a plurality of battery cells with said cell cases forming a portion of a sealed enclosure of said plurality of battery cells, said plurality of battery cells being electrically connected in series;
a box for accommodating therein said plurality of battery modules arranged in a condition with coolant passages formed between the battery modules;
each of the integral battery case being constructed of metal; and
an insulating film enveloping each of the electrode plate groups so as to insulate said electrode plate groups from the metal of the integral battery case.

6. The battery pack according to claim 5, further comprising:
said cell cases having cell case opening apertures through which said electrode plate groups are disposed into said cell cases;
said box having a box opening aperture through which said plurality of battery modules are disposed into said box; and
a cover closing both said box opening aperture and said cell case opening apertures.

7. The battery pack according to claim 6, said cover includes:
an upper frame engaging said box opening aperture and said cell case opening apertures, said upper frame incorporating interconnections of said electrode plate groups of said battery cells effecting said connection of said plurality of battery cells in series; and
a lid closing said upper frame.

8. The battery pack according to claim 7, wherein said cell cases, including said common partition walls, and said cover form an enclosure effecting sealing of said electrode plate groups of said modules from an environment around the box.

9. A battery pack comprising:
a plurality of battery modules, each of said plurality of battery modules being constructed of an integral battery case which is constituted by forming a plurality of cell cases as a unitized body with common partition walls of the unitized body shared between adjacent ones of the cell cases;
elements for electromotive force forming electrode plate groups respcetively accommodated in each of said cell cases, thereby constituting a plurality of battery cells with said cell cases forming a portion of a sealed enclosure of said plurality of battery cells, said plurality of battery cells being electrically connected in series;
a box for accommodating therein said plurality of battery modules arranged in a condition with coolant passages formed between the battery modules;
said cell cases having cell case opening apertures through which said electrode plate groups are disposed into said cell cases;
said box having a box opening aperture through which said plurality of battery modules are disposed into said box; and
a cover closing both said box opening aperture and said cell case opening apertures.

10. The battery pack according to claim 9, said cover includes:
an upper frame engaging said box opening aperture and said cell case opening apertures, said upper frame incorporating interconnections of said electrode plate groups of said battery cells effecting said connection of said plurality of battery cells in series; and
a lid closing said upper frame.

11. The battery pack according to claim 10, wherein said cell cases, including said common partition walls, and said cover form an enclosure effecting scaling of said electrode plate groups or said modules from an environment around the box.

12. The battery pack according to claim 9, said cell cases, including said common partition walls, and said cover form an enclosure effecting sealing of said electrode plate groups of said modules from an environment around the box.

13. The battery pack according to claim 5, further comprising a cover for closing said box wherein said cell cases, including said common partition walls, and said cover form an enclosure effecting sealing of said electrode plate groups of said modules from an environment around the box.

* * * * *